United States Patent Office 2,847,390
Patented Aug. 12, 1958

2,847,390
ORGANIC FLUOSILICATE-CONTAINING POLYMERIC COATING COMPOSITION AND METHOD OF APPLYING

Derek E. Till, Concord, Mass., assignor to Arthur D. Little, Inc., Cambridge, Mass., a corporation of Massachusetts No Drawing. Application August 28, 1956
Serial No. 606,545

12 Claims. (Cl. 260—29.6)

This invention relates to an improved composition for securing adhesion to certain organic polymeric materials to glass surfaces and a novel method of making and applying said compositions to glass surfaces. In one specific aspect, it relates to the composition formed by admixing polyvinyl esters and alcohols and derivatives thereof with organic nitrogenous silicofluorides.

A satisfactory organic coating material for glass surfaces has been continuously in demand as an industrial commodity, particularly for stabilizing glass fibers, for securing adherence of lubricating films to glass fibers, and for labeling and decorating glass containers. Such coating materials must meet two essential requirements, reasonable heat stability and solvent resistance. Satisfactory adhesion involves not only stability under ordinary mechanical handling and packing techniques but enhanced resistance to deterioration under washing, scrubbing and sterilization processes to which glass articles are frequently subjected. Most conventional coatings have been observed to crack or flake during these extraordinary but necessary treatments.

To overcome these notable deficiencies, the art has introduced various pretreatments of the glass surface, prior to the application of the coating resin. Such pretreatments invoke the use of alkali metal silicates and bichromates or hydrofluoric acid. While some improvement in adhesion is attained by such methods the performance of the films under service conditions seems to be somewhat erratic and to a certain extent unpredictable. Obviously, such pretreatment entails additional expense in processing and equipment, particularly in the case of hydrofluoric acid. To circumvent these difficulties special coating compositions have been developed. For instance, it has been known to mix unsaturated resins derived from 2-alkenyl esters or 2-alkenyloxyalkyl esters containing 2 or more ethylenic linkages with a minor portion of ammonium fluoride or bifluoride and thereafter to bake the mixture at temperatures from about 120° C. to 250° C. to secure surface films which have improved adhesive properties. I have discovered a superior coating composition prepared by admixing either a polyvinyl ester, a copolymer of a vinyl ester and a vinyl halide, a partially hydrolyzed polyvinyl ester, or the condensation product of the hydrolyzed ester with an aldehyde and an organic nitrogenous silicofluoride. My novel surface films have remarkable adhesive properties, as well as being highly resistant to specific solvents and to increased temperature.

Polymerization of vinyl acetate gives a tough, thermoplastic resin, soluble in aromatic hydrocarbons and other organic materials. See Reaction A:

(A)

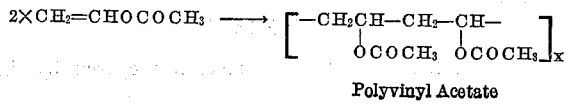

Polyvinyl Acetate

Saponification, or alkaline hydrolysis, of polyvinyl acetate gives polyvinyl alcohol (Reaction B).

(B)

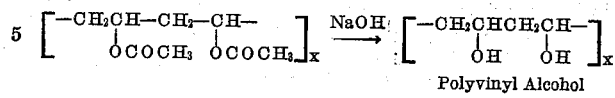

Polyvinyl Alcohol

This interesting resin, soluble in water but insoluble in organic solvents, has physical properties similar to those of starch. Since most of the hydroxyl groups of polyvinyl alcohol occupy 1,3 positions, it readily reacts with aldehydes to give polyvinyl acetals having 6 membered rings. For instance, the condensation reaction with N-butyraldehyde, shown below in Reaction C, yields polyvinyl butyral, an excellent filler in manufacture of strong safety glass.

(C)

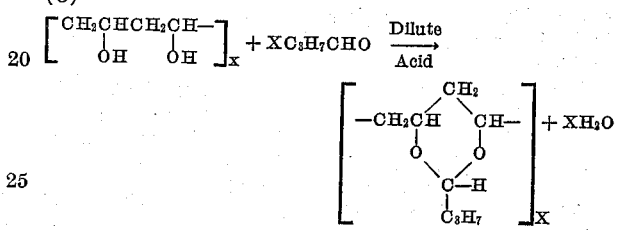

Copolymerization of vinyl acetate and vinyl chloride in various proportions and to varying degrees of polymerization gives products known as "vinylite" resins which have a wide range of properties. Such resins are very inert to chemical agents and weathering. They can be used to produce surface coatings that are long wearing and scuff and stain resistant.

While the polyvinyl acetates, polyvinyl alcohols, aldehyde condensation products of the polyvinyl alcohols, and copolymers of vinyl acetate and vinyl chloride have properties which make them exceptionally suited to coating compositions or exceptionally suitable as coating compositions from the standpoint of resistivity to specific solvents and heat they lack the necessary proclivity to adhere to glass surfaces. The crux of my invention lies in imparting adherence to such polyvinyl materials.

It is well known that amines will react with aqueous fluosilicic acid to form an addition compound. The reaction for a typical primary amine (methylamine) is shown hereinunder in Reaction D:

(D)    $2CH_3NH_2 + H_2SiF_6 \rightarrow (CH_3NH_2)_2SiF_6$

Other nitrogenous compounds that form fluosilicate salts include secondary, tertiary, and poly amines, some amides, and quaternary ammonium compounds. The preparation of these amine fluosilicates are shown below in Reactions E to I.

Secondary:
(E)    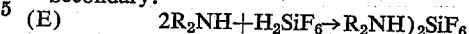
Tertiary:
(F)    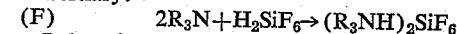
Polyamine:
(G)    
Amide:
(H)    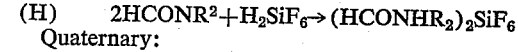
Quaternary:
(I)    

Organic fluosilicates are crystalline compounds, wax or resinous-like solids. Low molecular weight amine fluosilicates such as methyl, ethyl, and propyl amines are usually water soluble and insoluble in organic solvents. For example, methylamine fluosilicate is 67.5% soluble in water and only 0.4% soluble in ethyl alcohol. Hydroxyl groups, such as contained in the isopropyl and glycol amines, increase water solubility. Branching or inclusion of side chains, such as in the di-2-ethylhexyl-amine fluosilicate, increases hydrocarbon solubility. This latter compound is highly soluble in all organic solvents. The medium molecular weight compounds (e. g. those containing 6 to 9 carbon atoms) are usually water-insoluble and hydrocarbon soluble. The high molecular weight compounds are water-insoluble and only slightly soluble in hydrocarbons.

The organic nitrogenous fluosilicates usually do not undergo hydrolysis and most of them are stable at high temperatures up to about 200° C. On heating at elevated temperatures, they decompose into the free base, hydrogen fluoride and silicon tetrafluoride. The fluorine in these compounds ranges from 10 to 55%, depending on the chain length of the amine or amine derivative selected for the reaction. I have found that the addition of such a fluosilicate in a minor proportion to polyvinyl resins imparts to these resins the necessary quality of adhesion to glass surfaces.

It is therefore an object of the present invention to provide a novel and improved coating composition which is remarkably adherent to glass surfaces and an economically feasible method of preparing and applying these compositions.

In accordance with the present invention, I have discovered that organic nitrogenous fluosilicates (hereinafter described by referring to the amine fluosilicates) can be conveniently admixed with solutions of polyvinyl resins to impart an adhesive property to films of these resins which are deposited on glass surfaces and subsequently dried. Two attributes of these compounds serve to make them effective for this purpose. First, the amine fluosilicates can be distributed uniformly throughout the thermoplastic resin. Second, the effect of the fluoride ion upon glass surfaces imparts an adhesive property to the thermoplastic resin when it is applied to the glass surfaces. In preparing solutions from which to cast my novel coating compositions, I have found it convenient to admix in solution from 5 to 15% of the polyvinyl resin with from 0.5 to 2% of the organic fluosilicate based on the amount of resin present.

The choice of a particular amine fluosilicate for use with a given polyvinyl resin is determined to some extent by the solvent selected for the system, since it is desirable to select a fluosilicate which is soluble in the same solvent as that used for preparing the polymer solution. The art of solubilizing polyvinyl materials for film forming purposes is well established. Generally speaking, polyvinyl acetate films are prepared from emulsions and films of polyvinyl alcohol (which is the product by saponification or alkaline hydrolysis of polyvinyl acetate) are made from aqueous solutions. Copolymers of vinyl acetate and vinyl chloride are soluble in various individual and mixed solvents; a typical good one for film forming purposes being 45 parts toluene, 45 parts methyl ethyl ketone and 10 parts ethanol. When polyvinyl butyral or a similar aldehyde condensation product is chosen as a starting material, it is necessary to use alcohol or a similar unreactive organic solvent from which to cast the coating film. Such unreactive organic solvents include: ketones, e. g. acetone, methyl ethyl ketone; alcohols, e. g. methyl, ethyl, butyl, etc.; alcohol-acetate mixtures; and alkyl Cellosolves. The exact choice is predicated on the desired evaporation rate.

Practical limitations govern the preparation of the casting solutions. For instance, a solution having above about 15% of the polyvinyl starting material may be too viscous for convenient application. If the quantity of starting material is reduced below 5%, the resulting film cast upon the glass surface is too thin to demonstrate the desired result.

Since a suitable concentration for a given polyvinyl material will vary with the choice of polymer, viscosity data is a good yardstick for my novel casting solutions. A solution having a viscosity between 1000 and 5000 cps. is satisfactory for forming films.

The relative quantity of amine fluosilicate to be admixed with the thermoplastic resin is likewise predicated on convenience of operation. If the amount of fluosilicate is in excess of 2% by weight based upon the quantity of thermoplastic resin, the resulting coating may become cloudy or milky in appearance, according to the compatibility of the fluosilicate with the resin. On the other hand, if less than 0.1% by weight is added to the starting polyvinyl resin, the resulting film lacks the desired adhesive properties when applied to a glass surface.

The glass surface is treated by contacting it with the casting solution, usually by pouring the casting solution onto the glass surface. The resulting film can be air or oven dried onto the glass surface at a low temperature.

I have found that fluosilicates of methylamine, morpholine, di-n-butylamine, rosinamine, aniline, di-2-ethylhexylamine, dimethylamine, trimethylamine, ethylamine, diethylamine, triethylamine, propylamine, dipropylamine, isopropylamine, di-isopropylamine, butylamine tributylamine, amylamine, diamylamine, triamylamine, hexylamine, cyclohexylamine, heptylamine, dicyclohexylamine, 2-ethylhexylamine, nonylamine, dinonylamine, octylamine, dioctylamine, N-nonyl-t-octylamine, decylamine, dodecylamine, tetradecylamine, octadecylamine, tallow amine, ditallowamine, soyaamine, cocoamine, dicocoamine, stearylamine, ethanolamine, diethanolamine, triethanolamine, methylethanolamine, ethylethanolamine, butylethanolamine, phenylethanolamine, diethylaminoethanol, dimethylaminoethanol, o-tolylethanolamine, diethylethanolamine, isopropanolamine, d i i s o p r o p a -nolamine, triisopropanolamine, dimethylisopropanolamine, 2-amino-1-butanol, ethylenediamine, propylenediamine, hydroxyethylenediamine, diethylenetriamine, N-N'-diethylethylenediamine, aminopropyl tallowamine, aminopropyl soyamine, aminopropyl cocoamine, ethylmorpholine, n - aminopropylmorpholine, n-aminoethylmorpholine, pyridine, acetylethanolamine, o-toluidine, alpha naphthylamine, guanidine, phenylguanidine, guanylurea, acetylenediurein, furfurylamine, dimethylformamide, 2 - amino - 2 - methyl-1,3-propanediol, 2-amino-2-methyl - 1 - propanol, 2 - amino-2-ethyl-1,3-propanediol, tris(hydroxymethyl) aminoethane, tris(hydroxyethyl)-aminoethane, 1-hydroxyethyl-2-heptadecenyl-glyoxaldine, 2 - ethylhexyl - 3-aminopropylether, tetraethanolammoniumhydroxide, morpholine ethanol, 1-alkyl-2-heptadecenyl-2-imidazoline, 1 - alkyl - 2-heptadecyl-2-imidazoline, benzyldimethylamine, phenylbiguanide, dicyandiamide, 2-amino-1-butanol, hexamethylenediamine, n-nonylalkylamine, hexamethylene tetramine, hydrogenated tallow amine are useful for the purposes of the present invention according to their solubility and compatibility with the resin. Of these compounds, I have noted that the fluosilicates of ethylenediamine, cyclohexylamine and guanidine are especially suitable in making polyvinyl alcohol films. Di-2-ethylhexylamine gives outstanding results in the preparation of polyvinyl butyral casting solutions.

My invention is further illustrated by the following examples:

EXAMPLE I

A 10% solution of a copolymer of vinyl alcohol and vinyl acetate having the commercial designation "Elvanol 50-42" was prepared. A film was cast on a prepared glass plate and air-dried. To the remaining solution, 1% guanidine fluosilicate based on the vinyl copolymer content was added. A second film was prepared and dried. The film containing the silicofluoride could only be removed from the plate with difficulty, whereas the blank film peeled off easily. Other films were cast for subsequent mechanical testing which is described hereafter in Example II.

EXAMPLE II

10% solutions of polyvinyl alcohol prepared by the procedure of Example I were admixed separately with varying portions of guanidine fluosilicate and cyclohexylamine fluosilicate. Six solutions were prepared in all, three with each additive, containing 1%, 0.5%, and 0.1% by weight of fluosilicate based on the polyvinyl alcohol content respectively. Films were cast from the various solutions and tested by the following procedure. One-half inch strips of glass tape were imbedded in the film before the evaporation of the solvent. After hardening, the glass tape was peeled from the plate using a modified Schopper Tensile Tester. This method makes it possible to obtain an approximate numerical value which is related to the adhesion between the glass plate and the film. The results of these tests with films dried at 70° F. at 50% relative humidity are shown below in Table I.

Table I

ADHESION OF PVA FILMS TO GLASS SURFACES

| Film | Percent Additive (based on PVA) | Force lbs./in. width to Peel Tape |
|---|---|---|
| Blank | | 14 |
| Fluosilicate: | | |
| Guanidine | 1.0 | 44 |
| Do | 0.5 | 26 |
| Do | 0.1 | 32 |
| Cyclohexylamine | 1.0 | 33 |
| Do | 0.5 | 41 |
| Do | 0.1 | 32 |

EXAMPLE III 75 g. of polyvinyl butyral were dissolved in 150 ml. of ethyl alcohol. To this solution, 25 g. of a commercial phosphate plasticizer (Dow plasticizer No. 5, essentially 2-biphenylyl diphenyl phosphate) were added. The plasticizing agent was added to prevent cracking of the butyral film during the peeling tests since an unplasticized butyral film is markedly inflexible. A film was cast and air dried. One g. of di-2-ethylhexylamine fluosilicate was then added and other films were cast. This latter type film adhered much more strongly to the glass plate than that containing no fluosilicate.

Additional films were cast with and without the addition of the di-2-hexylamine fluosilicate. Some of the films were air dried and others were heated to 149° C. for five minute periods. The peeling tests using the Schopper Tensile Tester described in Example II were repeated with these films. The results are summarized below in Table II.

Table II

EFFECT OF DRYING CONDITIONS ON FILM ADHERENCE

| Drying Conditions | Force lb./in. width to Peel Tape | |
|---|---|---|
| | Blank Film | Film Containing Di-2-ethylhexyl Amine Fluosilicate |
| Air (70° F.) | 4 | 15 |
| Do | 1 | 12.5 |
| Do | 1 | 13 |
| Do | 1 | 13.5 |
| Do | 1 | 12 |
| Heated to 149° C. for 5 minutes | 6.5 | 17.4 |
| Do | 6.5 | 17 |

Although the bond strength is increased by curing at elevated temperatures, films treated in this manner showed less adhesion when immersed in water than did the air dried films. On immersion, films containing no additives came off the plates almost immediately. Those cured at 149° C. peeled off the plates easily after two hours, whereas the air dried film still showed good adhesion, even after a 5 hour period of immersion.

EXAMPLE IV

The procedure of Example I was repeated using polyvinyl acetate films prepared from emulsions of the products known commercially as Elvacet 80-9000 and 81-900. Such films showed a noticeable increase in adhesive properties when 1% by weight based on the amount of polyvinyl acetate of guanidine fluosilicate was added to the casting solution.

EXAMPLE V

The procedure of Example I was repeated using 10% solutions of a copolymer of 90% vinyl chloride, 3% vinyl acetate and 6% vinyl alcohol admixed with 1% by weight of cyclohexylamine fluosilicate based on the amount of resin present. The solvent used for preparing the casting solution contained 45 parts toluene, 45 parts methyl ethyl ketone and 10 parts ethanol. It was noted that the addition of the fluosilicate increased the adhesive properties of the resin film.

The foregoing tests demonstrate that I have discovered an effective and competitive method of improving the adhesion characteristics of polymeric films on glass surfaces. Since the amine fluosilicates are relatively inexpensive to prepare on a commercial scale, I have provided a low cost resistant coating material for glass surfaces with improved adherent characteristics. My novel composition is also useful as a backing and strengthening material for glass fibers.

I claim:

1. A coating composition comprising 5 to 15% by weight of a polymeric material selected from the group consisting of polyvinyl acetate, polyvinyl alcohol, polyvinyl acetals, copolymers of vinyl acetate and vinyl chloride, copolymers of vinyl alcohol and vinyl acetate, and copolymers of vinyl alcohol, vinyl acetate and vinyl chloride in admixture with 0.1 to 2% by weight of an organic amine fluosilicate based upon the amount of said polymeric material present in an inert liquid medium.

2. A method of securing improved adhesion of polymeric materials to glass surfaces which comprises applying to a glass surface a coating composition as set forth in claim 1 and thereafter air drying the coated glass to secure a highly adherent surface film.

3. A coating composition comprising an aqueous emulsion containing 5 to 15% by weight of polyvinyl acetate and 0.1 to 2% of dibutylamine fluosilicate based on the weight of said polyvinyl acetate.

4. A method of securing improved adhesion of polymeric materials to glass surfaces which comprises applying to a glass surface a coating composition as set forth in claim 3 and thereafter air drying the coated glass to secure a highly adherent surface film.

5. A coating composition comprising an aqueous solution containing 5 to 15% by weight of polyvinyl alcohol and 0.1 to 2% ethylenediamine fluosilicate based on the weight of said polyvinyl alcohol.

6. A method of securing improved adhesion of polymeric materials to glass surfaces which comprises applying to a glass surface a coating composition as set forth in claim 5 and thereafter air drying the coated glass to secure a highly adherent surface film.

7. A 2-biphenylyl diphenyl phosphate plasticized coating composition comprising an alcoholic solution containing 25 to 50% weight of polyvinyl butyral and 0.1 to 2% of di-2-ethylhexylamine fluosilicate based on the weight of said polyvinyl butyral.

8. A method of securing improved adhesion of polymeric materials to glass surfaces which comprises applying to a glass surface a coating composition as set forth in claim 7 and thereafter air drying the coated glass to secure a highly adherent surface film.

9. A coating composition comprising to 5 to 15% by weight of a resinous copolymer of vinyl alcohol, vinyl acetate and vinyl chloride and 0.1 to 2% of cyclohexylamine fluosilicate based on the weight of said resinous copolymer; said components being dissolved in a solvent system consisting of 45 parts toluene, 45 parts methyl ethyl ketone, and 10 parts ethanol.

10. A method of securing improved adhesion of polymeric materials to glass surfaces which comprises applying to a glass surface a coating composition as set forth in claim 9 and thereafter air drying the coated glass to secure a highly adherent surface film.

11. A coating composition comprising an aqueous solution containing 5 to 15% by weight of a copolymer of vinyl alcohol and vinyl acetate and 0.1 to 2% guanidine fluosilicate based on the weight of said copolymer.

12. A method of securing improved adhesion of polymeric materials to glass surfaces which comprises applying to a glass surface a coating composition as set forth in claim 11 and thereafter air drying the coated glass to secure a highly adherent surface film.

References Cited in the file of this patent

UNITED STATES PATENTS

| | | |
|---|---|---|
| 2,483,836 | McCoy | Oct. 4, 1949 |
| 2,759,958 | Fitch | Aug. 21, 1956 |

UNITED STATES PATENT OFFICE
CERTIFICATE OF CORRECTION

Patent No. 2,847,390                                            August 12, 1958

Derek E. Till

It is hereby certified that error appears in the printed specification of the above numbered patent requiring correction and that the said Letters Patent should read as corrected below.

Column 1, line 31, for "packing" read -- packaging --; column 2, line 55, for "$\rightarrow R_2NH)_2SiF_6$" read -- $\rightarrow (R_2NH)_2SiF_6$ --; line 61, for "$2HCONR^2$" read -- $2HCONR_2$ --.

Signed and sealed this 13th day of January 1959.

(SEAL)
Attest:

KARL H. AXLINE                                          ROBERT C. WATSON
Attesting Officer                                        Commissioner of Patents